United States Patent
Ang et al.

(10) Patent No.: US 8,963,482 B2
(45) Date of Patent: Feb. 24, 2015

(54) POWER SUPPLY APPARATUS FOR ELECTRICALLY POWERED VEHICLE AND METHOD FOR CONTROLLING THE SAME

(75) Inventors: Wanleng Ang, Toyota (JP); Yoshinobu Sugiyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 59 days.

(21) Appl. No.: 13/992,280

(22) PCT Filed: Dec. 16, 2010

(86) PCT No.: PCT/JP2010/072650
§ 371 (c)(1),
(2), (4) Date: Jun. 7, 2013

(87) PCT Pub. No.: WO2012/081103
PCT Pub. Date: Jun. 21, 2012

(65) Prior Publication Data
US 2013/0257375 A1   Oct. 3, 2013

(51) Int. Cl.
*H02J 7/00* (2006.01)
*B60L 11/18* (2006.01)
*H02J 7/02* (2006.01)

(52) U.S. Cl.
CPC ......... *B60L 11/1824* (2013.01); *B60L 11/1811* (2013.01); *H02J 7/022* (2013.01); *H02J 7/0003* (2013.01); *Y02T 10/7005* (2013.01); *Y02T 10/7088* (2013.01); *Y02T 90/14* (2013.01); *Y02T 90/127* (2013.01)
USPC .......................................... 320/104; 320/103

(58) Field of Classification Search
CPC ... Y02T 90/127; Y02T 90/14; B60L 11/1811; H02J 7/022
USPC .......................... 320/103, 104, 109, 140, 134
See application file for complete search history.

(56) References Cited

U.S. PATENT DOCUMENTS

| | | | |
|---|---|---|---|
| 8,242,627 B2 * | 8/2012 | Ichikawa | ............ 307/10.1 |
| 2009/0289589 A1 | 11/2009 | Fujino et al. | |

FOREIGN PATENT DOCUMENTS

| | | |
|---|---|---|
| CN | 101499673 A | 8/2009 |
| EP | 2 255 990 A1 | 12/2010 |
| JP | A-08-154311 | 6/1996 |
| JP | 9-9417 A | 1/1997 |
| JP | 9-65509 A | 3/1997 |
| JP | 2009-225587 A | 10/2009 |
| JP | A-2010-004732 | 1/2010 |
| JP | A-2010-272412 | 12/2010 |
| JP | A-2010-279159 | 12/2010 |

* cited by examiner

*Primary Examiner* — Edward Tso
*Assistant Examiner* — Aaron Piggush
(74) *Attorney, Agent, or Firm* — Oliff PLC

(57) ABSTRACT

An electrically powered vehicle has a main battery and an auxiliary battery mounted therein. In external charging, a charging device performs AC/DC power conversion converting power received from an external power supply into power charged to main battery. A sub charging relay is connected between a predetermined node on an electric conduction path of the charging device in the AC/DC power conversion and the auxiliary battery. The sub charging relay is turned off in the external charging. The charging device is configured such that when the external charging is not performed and the sub charging relay is turned on the charging device performs DC/DC power conversion to convert power of the main battery via at least a portion of the electric conduction path in the AC/DC power conversion into power to be charged to the auxiliary battery and outputs the converted power on the predetermined node.

15 Claims, 10 Drawing Sheets

POWER SUPPLY APPARATUS FOR ELECTRICALLY POWERED VEHICLE AND METHOD FOR CONTROLLING THE SAME

TECHNICAL FIELD

The present invention relates to a power supply apparatus for an electrically powered vehicle and to a method for controlling the same. More specifically, the present invention relates to controlling charging a power storage device in an electrically powered vehicle configured to be capable of charging an in-vehicle power storage device by a power supply external to the vehicle.

BACKGROUND ART

For an electrically powered vehicle such as an electric vehicle and a hybrid vehicle driving a traction motor by power received from a power storage device represented by a rechargeable battery, a configuration for charging an in-vehicle power storage device by a power supply external to the vehicle (hereinafter also simply referred to as an "external power supply") has been proposed. Charging a power storage device by an external power supply will hereinafter also be simply referred to as "external charging" or the like.

Generally an electrically powered vehicle has mounted therein two types of power storage devices, i.e., a high-voltage power storage device (a main battery, for example) used to feed power to a traction motor and a low-voltage power storage device (an auxiliary battery, for example) used to feed power to auxiliaries including a control device.

Japanese Patent Laying-Open No. 2009-225587 (PTD 1) describes a configuration to provide external charging more efficiently and also ensure an auxiliary load system's operation. Specifically, the publication describes providing a path to charge a main battery 10 externally to allow the external charging and the auxiliary load system's operation to be both established while a relay 150C (a system main relay) between a traction motor 30 and main battery 10 is turned off.

Furthermore, Japanese Patent Laying-Open Nos. 9-009417 and 9-065509 (PTDs 2 and 3, respectively) describe techniques for miniaturizing a charger mounted in an electric vehicle. Specifically, a main battery and a battery for auxiliaries share a charger to achieve a miniaturized and more inexpensive charger.

CITATION LIST

Patent Document

PTD 1: Japanese Patent Laying-Open No. 2009-225587
PTD 2: Japanese Patent Laying-Open No. 9-009417
PTD 3: Japanese Patent Laying-Open No. 9-065509

SUMMARY OF INVENTION

Technical Problem

PTD 1 describes an electrically powered vehicle configured such that main battery 10 outputs voltage which is in turn buck-boosted by a DC/DC converter 60 to ensure power charged to an auxiliary battery 70, i.e., power consumed by an auxiliary load 80.

However, DC/DC converter 60 is required to have a relatively large capacity to ensure power consumed by the auxiliary load. In other words, the configuration of PTD 1 requires a charger (a power converter 110) for external charging and in addition thereto a DC/DC converter of relatively large capacity.

PTDs 2 and 3 describe that a main battery B1 and a battery B2 for auxiliaries share a charger to achieve a miniaturized and more inexpensive charger. Specifically, when the charger charges battery B2 for auxiliaries, the charger operates to provide power conversion in a direction opposite to that in which power received from a commercial alternating current power supply AC is converted into power charged to main battery B1. However, battery B2 for auxiliaries is charged by voltage output from the charger and buck-boosted by a voltage regulation circuit 8. It is understood that voltage regulation circuit 8, as well as DC/DC converter 60 of PTD 1, is required to be of relatively large capacity in order to ensure power consumed by auxiliaries.

Thus, in PTDs 1-3, it is necessary to mount a power converter (a DC/DC converter) of relatively large capacity for ensuring power consumed by auxiliaries, and accordingly, there is a limit in reducing a power supply apparatus in size and cost.

The present invention has been made to overcome the above disadvantage, and it contemplates allowing an electrically powered vehicle having a charging device mounted therein for external charging to share a configuration used for the external charging as that used to ensure power that is consumed by auxiliaries to achieve a miniaturized and more inexpensive charging device.

Solution to Problem

The present invention in one aspect provides a power supply apparatus for an electrically powered vehicle, including: a main power storage device; a sub power storage device outputting a voltage lower than that of the main power storage device; a charging device; and a first switch. The charging device is configured to operate, in external charging, to perform first power conversion to receive power from an external power supply and convert the received power into power charged to the main power storage device. The first switch is connected between a predetermined node on an electric conduction path of the charging device in the first power conversion and the sub power storage device, and opened in the external charging. Furthermore, the charging device is configured such that when the external charging is not performed and the first switch is closed the charging device performs second power conversion to receive power from the main power storage device and convert the received power via at least a portion of the electric conduction path in the first power conversion into power to be charged to the sub power storage device and the charging device outputs the converted power on the predetermined node.

Preferably, in the power supply apparatus for an electrically powered vehicle, when the external charging is not performed, the first switch is closed and the charging device performs the second power conversion, depending on in what condition an auxiliary load operating on power received from the sub power storage device operates.

Furthermore, preferably, the power supply apparatus for an electrically powered vehicle further includes a power converter operative in the external charging for converting power on a path of the first power conversion into power charged to the sub power storage device. The power provided via the power converter to be charged to the sub power storage device is smaller than that provided via the charging device through the second power conversion to be charged to the sub power storage device.

Furthermore, preferably, in the external charging when an auxiliary load operating on power received from the sub power storage device consumes power equal to or larger than a predetermined value the charging device operates to alternate a period of time of performing the first power conversion and a period of time of performing the second power conversion. While the charging device performs the first power conversion, the first switch is opened, whereas a second switch connected between the external power supply and the charging device is closed. While the charging device performs the second power conversion, the first switch is closed, whereas the second switch is opened.

For example, the charging device includes a first power conversion unit and a second power conversion unit. The first power conversion unit is configured to perform alternating current/direct current voltage conversion from a first power line connected to the external power supply toward a second power line. The second power conversion unit is configured to perform bidirectional direct current/direct current voltage conversion between a third power line connected to the main power storage device and the second power line. In this exemplary configuration, in the first power conversion, the first power conversion unit converts alternating current voltage on the first power line into direct current voltage and outputs the direct current voltage on the second power line and the second power conversion unit converts the direct current voltage on the second power line into voltage to be applied to charge the main power storage device and outputs the converted voltage on the third power line, whereas in the second power conversion, the first power conversion unit is inactivated and the second power conversion unit receives voltage from the main power storage device on the third power line, buck-boosts the received voltage to voltage to be applied to charge the sub power storage device, and outputs the buck-boosted voltage on the second power line. The predetermined node is provided on the second power line.

Alternatively, as another example, the charging device includes a first power conversion unit and a second power conversion unit. The first power conversion unit is configured to be operative in the first power conversion to perform alternating current/direct current voltage conversion from a first power line connected to the external power supply toward a second power line, and operative in the second power conversion to perform direct current/direct current voltage conversion from the second power line toward the first power line. The second power conversion unit is configured to perform bidirectional direct current/direct current voltage conversion between a third power line connected to the main power storage device and the second power line. In this exemplary configuration, in the first power conversion, the first power conversion unit converts alternating current voltage on the first power line into direct current voltage and outputs the direct current voltage on the second power line, and the second power conversion unit converts the direct current voltage on the second power line into voltage to be applied to charge the main power storage device and outputs the converted voltage on the third power line, whereas in the second power conversion, the second power conversion unit receives voltage output from the main power storage device and transmitted on the third power line, buck-boosts the received voltage, and outputs the buck-boosted voltage on the second power line, and the first power conversion unit buck-boosts direct current voltage on the second power line to voltage applied to charge the sub power storage device. The predetermined node is provided on a power line receiving voltage output by the first power conversion unit to charge the sub power storage device.

The present invention in another aspect provides a method for controlling a power supply apparatus for an electrically powered vehicle including a main power storage device and a sub power storage device outputting a voltage lower than that of the main power storage device. The method includes the steps of: (i) in external charging performed to charge the main power storage device by an external power supply, causing a charging device to perform first power conversion to receive power from the external power supply and convert the received power into power charged to the main power storage device; (ii) in the external charging, opening a first switch connected between a predetermined node on an electric conduction path of the charging device in the first power conversion and the sub power storage device; (iii) closing the first switch when the first power conversion is not performed; and (iv) when the first switch is closed, causing the charging device to perform second power conversion to receive power from the main power storage device, convert the received power via at least a portion of the electric conduction path in the first power conversion into power to be charged to the sub power storage device, and output the converted power on the predetermined node.

Preferably the method further includes the steps of: when the external charging is not performed, determining whether it is necessary to charge the sub power storage device from in what condition an auxiliary load operating on power received from the sub power storage device operates; and inactivating the charging device when it is determined that it is unnecessary to charge the sub power storage device. Step (ii) closes the first switch when it is determined that it is necessary to charge the sub power storage device when the external charging is not performed.

Furthermore, preferably, the method further includes the step of operating a power converter in the external charging for converting power on a path of the first power conversion into power charged to the sub power storage device, and the power provided via the power converter to be charged to the sub power storage device is smaller than that provided via the charging device through the second power conversion to be charged to the sub power storage device.

Alternatively, preferably, the method further includes the steps of: in the external charging, determining whether an auxiliary load operating on power received from the sub power storage device consumes power larger than a predetermined value; and when the auxiliary load consumes power larger than the predetermined value, controlling the charging device to alternate a period of time of performing the first power conversion and a period of time of performing the second power conversion. While the charging device performs the first power conversion, the first switch is opened, whereas a second switch connected between the external power supply and the charging device is closed. While the charging device performs the second power conversion, the first switch is closed, whereas the second switch is opened.

Advantageous Effects of Invention

The present invention thus allows an electrically powered vehicle having a charging device mounted therein for external charging to share a configuration used for the external charging as that used to ensure power that is consumed by auxiliaries to achieve a miniaturized and more inexpensive charging device.

DESCRIPTION OF EMBODIMENTS

The present invention in embodiments will hereinafter be described in detail with reference to the drawings. In the figures, identical or corresponding components are identically denoted and will not be described repeatedly in principle.

First Embodiment

Figure 1:
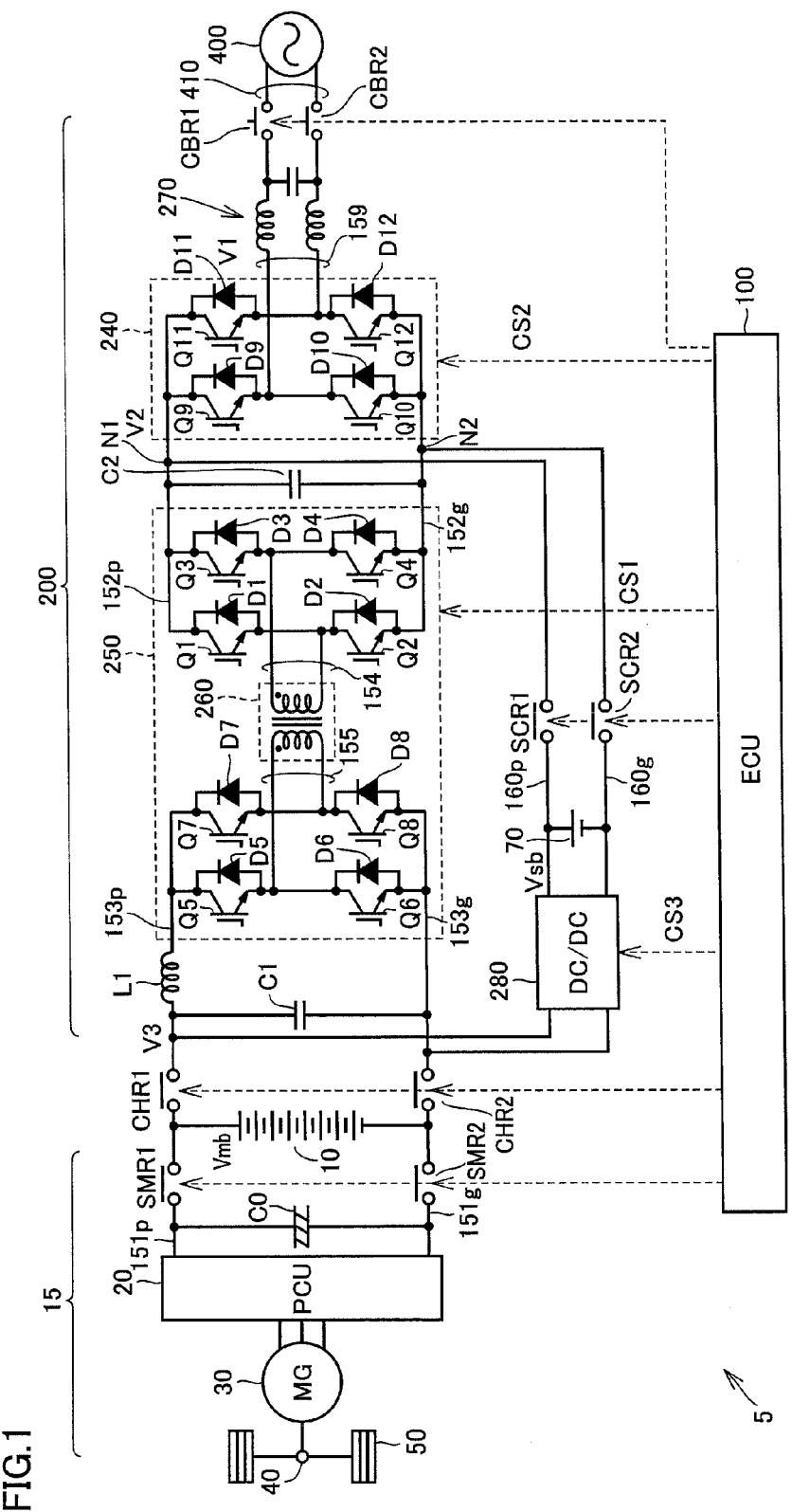
FIG. 1 is a circuit diagram showing a configuration of a power supply apparatus for an electrically powered vehicle in accordance with a first embodiment of the present invention.

FIG. 1 is a circuit diagram showing a configuration of a power supply apparatus for an electrically powered vehicle in accordance with a first embodiment of the present invention.

With reference to FIG. 1, an electrically powered vehicle 5 includes a main battery 10, system main relays SMR1 and SMR2, a power control unit (PCU) 20, a smoothing capacitor C0, a motor generator 30, a power transmission gear 40, a driving wheel 50, an auxiliary battery 70, and a control device 100. The FIG. 1 configuration minus motor generator 30, power transmission gear 40 and driving wheel 50 configures the power supply apparatus for electrically powered vehicle 5.

Main battery 10 is shown as an example of a "main power storage device", and is representatively configured of a rechargeable battery, such as a lithium ion battery or a nickel metal hydride battery. For example, main battery 10 outputs voltage for example of about 200 V. Alternatively, the "main power storage device" may be configured of an electric double layer capacitor, or a combination of a rechargeable battery and a capacitor or the like.

PCU 20 converts power that is stored in main battery 10 into power for controlling driving motor generator 30. For example, motor generator 30 is a permanent magnet type three-phase synchronous electric motor, and PCU 20 is configured of a three-phase inverter. Alternatively, PCU 20 may be configured of a combination of a converter variably controlling voltage output from main battery 10 and a 3-phase inverter receiving voltage from the converter and converting the received voltage into alternating current voltage.

System main relays SMR1 and SMR2 are connected to an electric conduction path between main battery 10 and PCU 20. System main relays SMR1 and SMR2 are turned on in response to a command issued to start an electrical system of electrically powered vehicle 5. Accordingly, at least when electrically powered vehicle 5 is operated, system main relays SMR1 and SMR2 are turned on so that motor generator 30 can be driven by power of main battery 10.

Main battery 10 has a positive electrode terminal and a negative electrode terminal connected via system main relays SMR1 and SMR2 to power lines 151$p$ and 151$g$ of PCU 20. Smoothing capacitor C0 is connected to power lines 151$p$, 151$g$ and smoothes direct current voltage.

Motor generator 30 outputs a torque which is in turn transmitted through power transmission gear 40, which is configured of a reduction gear, a power split device and/or the like, to driving wheel 50 and thus causes electrically powered vehicle 5 to travel. At the time of regenerative braking of electrically powered vehicle 5, motor generator 30 can generate power by rotational force of driving wheel 50. The generated power is then converted by PCU 20 into power charged to main battery 10.

For a hybrid vehicle having an engine (not shown) in addition to motor generator 30, the engine and motor generator 30 are cooperatively operated to generate vehicular driving force necessary for electrically powered vehicle 5. Here, it is also possible to charge main battery 10 using power generated by the engine's rotation. That is, electrically powered vehicle 5 collectively represents vehicles equipped with a traction motor, and includes a hybrid vehicle in which vehicular driving force is generated by an engine and an electric motor, an electric vehicle and a fuel cell vehicle which are not equipped with an engine, and the like.

Control device 100 is an electronic control unit (ECU) having a central processing unit (CPU) (not shown) and a memory (not shown) incorporated therein. The ECU is configured to use a map and a program stored in the memory to perform an operation process using a value sensed by each sensor. Alternatively, at least a portion of the ECU may be configured to perform prescribed arithmetic/logical operations by an electronic circuit or similar hardware.

Auxiliary battery 70 is shown as one example of a "sub power storage device" and it is a lead acid battery for example. Auxiliary battery 70 has a voltage lower than a voltage that main battery 10 outputs, and it is about 12 V for example. Auxiliary battery 70 supplies an auxiliary load (not shown) with power.

The auxiliary load (not shown) includes, for example, an air conditioner, audio equipment, navigation equipment, illumination equipment (a hazard lamp, a room lamp, a head lamp, and the like), and the like. Furthermore, the auxiliary load includes an electric-powered power steering system, an electric-powered oil pump, an electronic controlled miniature motor, and other similar traveling system loads directly used to cause the vehicle to travel. Furthermore, each ECU (not shown) including control device 100 also operates on power received from auxiliary battery 70. Hereinafter, power consumed by the auxiliary load will also simply be referred to as "power that is consumed by auxiliaries" or the like.

In addition to the above configuration, electrically powered vehicle 5 includes a charging device 200 and main charging relays CHR1 and CHR2 for externally charging main battery 10 (the main power storage device) by an external power supply 400. Electrically powered vehicle 5 further includes sub charging relays SCR1 and SCR2. Sub charging relays SCR1 and SCR2 correspond to a "first switch."

External power supply 400 is representatively configured of a commercial power grid. In the external charging, a charging cable 410 is electrically connected to electrically powered vehicle 5 to connect external power supply 400 to electrically powered vehicle 5.

Connection relays CBR1 and CBR2 are inserted in and thus connected to an electric conduction path between a power line 159 in electrically powered vehicle 5 and external power supply 400 via charging cable 410. Connection relays CBR1 and CBR2 are turned on (or closed) or turned off (or opened) for example in response to a control command issued from control device 100. Connection relays CBR1 and CBR2 correspond to a "second switch".

Connection relays CBR1 and CBR2 can be turned on when charging cable 410 is normally connected to electrically powered vehicle 5. Once the external charging ends, external power supply 400 can be electrically disconnected from charging device 200 by turning off connection relays CBR1 and CBR2 if charging cable 410 is still connected. Connection relays CBR1 and CBR2 may be disposed internal to electrically powered vehicle 5 or may be incorporated in charging cable 410.

Each relay indicated in the present embodiment is representatively an electromagnetic relay which is closed (or turned on) as it has its contact points connected when electrical conduction is provided and which is opened (or turned off) as it has its contact points disconnected when electrical conduction is not provided. It should be noted, however, that any switch that can be closed (or turned on) and opened (or turned off), as controlled, including a semiconductor relay, is applicable.

Charging device 200 includes a power conversion unit 240, a power conversion unit 250, an LC filter 270, a smoothing reactor L1, and smoothing capacitors C1, C2.

Power conversion unit 240 includes power semiconductor switching elements Q9 to Q12. In the present embodiment, the power semiconductor switching element (hereinafter also simply referred to as a "switching element") is exemplified by an insulated gate bipolar transistor (IGBT). However, a power metal oxide semiconductor (power MOS) transistor, a power bipolar transistor, or any similar element that can be turned on/off as controlled can be used as the switching element. Antiparallel diodes D9 to D12 are disposed for switching elements Q9 to Q12, respectively.

Switching elements Q9 to Q12 configure a full bridge circuit (hereinafter also referred to as the first full bridge circuit) between power line 159 and power lines 152$p$, 152$g$. Switching elements Q9 to Q12 are turned on/off as controlled in response to a control signal CS2 issued from control device 100.

Power conversion unit 250 includes switching elements Q1 to Q4 and Q5 to Q8, and an isolation transformer 260. Antiparallel diodes D1 to D8 are connected to switching elements Q1 to Q8, respectively. Switching elements Q1 to Q8 are turned on/off as controlled in response to a control signal CS 1 issued from control device 100.

Switching elements Q1 to Q4 configure a full bridge circuit (hereinafter also referred to as the second full bridge circuit) between power lines 152$p$, 152$g$ and a power line 154. Switching elements Q5 to Q8 configure a full bridge circuit (hereinafter also referred to as the third full bridge circuit) between a power line 155 and power lines 153$p$, 153$g$.

Each of the full bridge circuits in power conversion units 240, 250 can perform bi-directional AC/DC power conversion as the switching elements are turned on/off as controlled, as is well known. It is also known that direct current voltage (current) or alternate current voltage (current) can also be controlled in level by controlling a duty ratio of the switching elements in controlling turning on/off them.

Isolation transformer 260 has a primary side to which power line 154 is connected, and a secondary side to which power line 155 is connected. As is well known, isolation transformer 260 is configured to electrically isolate the primary and secondary sides and in that condition convert alternate current voltage in accordance with the number of turns.

Smoothing capacitor C2 smoothes the direct current voltage on power lines 152$p$, 152$g$. Smoothing capacitor C1 and smoothing reactor L1 smooth the direct current voltage and direct current on power lines 153$p$, 153$g$.

Main charging relays CHR1 and CHR2 are connected between power lines 153$p$, 153$g$ and the positive and negative electrode terminals of main battery 10. Main charging relays CHR1 and CHR2 are turned on and off by a control command issued from control device 100.

Sub charging relays SCR1, SCR2 are connected between predetermined nodes N1, N2 on an electric conduction path in charging device 200 in the externally charging and power lines 160$p$, 160$g$. Power lines 160$p$ and 160$g$ are electrically connected to auxiliary battery 70 at the positive and negative electrode terminals. In the FIG. 1 configuration, predetermined nodes N1 and N2 are provided on power lines 152$p$ and 152$g$. Sub charging relays SCR1 and SCR2 are turned on and off in response to a control command issued from control device 100.

Power line 159 corresponds to a "first power line", and power lines 152$p$ and 152$g$ correspond to a "second power line". Power lines 153$p$ and 153$g$ correspond to a "third power line". Furthermore, power conversion unit 240 corresponds to a "first power conversion unit". Power conversion unit 250 corresponds to a "second power conversion unit" or a "DC/DC conversion unit".

Hereinafter, how charging device 200 operates will be described more specifically. Charging device 200 in the external charging performs power conversion as described below (or first power conversion).

In the external charging, control device 100 turns on connection relays CBR1 and CBR2 and main charging relays CHR1 and CHR2. On the other hand, control device 100 turns off sub charging relays SCR1 and SCR2.

Connection relays CBR1 and CBR2 turned on allow power line 159 to have voltage V1 provided by alternating current voltage provided from external power supply 400.

The power conversion unit 240 first full bridge circuit (Q9 to Q12) converts the alternate current voltage (V1) on power line 159 into direct current voltage (V2) and outputs it on power lines 152$p$, 152$g$. In doing so, power conversion unit 240 controls AC/DC conversion to improve a power factor of the power supplied from external power supply 400. That is, power conversion unit 240 preferably also operates as a power factor correction (PFC) circuit in the external charging.

Generally, voltage V2 on power lines 152$p$, 152$g$ in the external charging is controlled by power conversion unit 240 to be direct current voltage higher than an amplitude of the alternate current voltage received from external power supply 400.

In power conversion unit 250, the second full bridge circuit (Q1 to Q4) converts the direct current voltage (V2) on power lines 152*p*, 152*g* into high-frequency alternate current voltage and outputs it on power line 154. The high-frequency alternate current voltage that has been output on power line 154 is transformed in accordance with a ratio of turns of the primary and secondary sides of isolation transformer 260 and thus output on power line 155. The third full bridge circuit (Q5 to Q8) converts the high-frequency alternate current voltage that has been output on power line 155 into direct current voltage (V3) and outputs it on power lines 153*p*, 153*g*. Direct current voltage V3 for power lines 153*p*, 153*g* is controlled to have a voltage command value Vr3 by controlling turning on/off switching elements Q1 to Q8 configuring the second and third full bridge circuits.

In the external charging, main charging relays CHR1, CHR2 are turned on, and main battery 10 is charged by voltage (V3) on power lines 153*p*, 153*g*. In other words, voltage command value Vr3 is set at a voltage level (or a charging voltage Vmb) suitable for charging main battery 10. Then, once the external charging ends, control device 100 turns off main charging relays CHR1 and CHR2 and connection relays CBR1 and CBR2.

Thus charging device 200 in the external charging performs AC/DC conversion (or the first power conversion) for converting alternate current power received from external power supply 400 into (direct current) power charged to main battery 10. Note that, in the external charging, it is preferable to turn off system main relays SMR1 and SMR2.

When the external charging is not performed, control device 100 can select charging the auxiliary battery. When the auxiliary battery is charged, connection relays CBR1 and CBR2 are turned off, while main charging relays CHR1 and CHR2 and sub charging relays SCR1 and SCR2 are turned on.

In charging the auxiliary battery, charging device 200 operates to charge auxiliary battery 70 by power conversion opposite in direction to that performed in the external charging. Specifically, charging device 200 is configured such that in charging the auxiliary battery, DC/DC conversion is performed to convert voltage output from main battery 10 into voltage applied to charge auxiliary battery 70 (i.e., second power conversion).

In power conversion unit 250, the third full bridge circuit (Q5 to Q8) converts the direct current voltage (V3) on power lines 153*p*, 153*g* into high-frequency alternate current voltage and outputs it on power line 155. Direct current voltage V3 is voltage output from main battery 10. The high-frequency alternate current voltage that has been output on power line 155 is transformed in accordance with a ratio of turns of isolation transformer 260 and thus output on power line 154.

The second full bridge circuit (Q1 to Q4) converts the high-frequency alternate current voltage that has been output on power line 154 into direct current voltage (V2) and outputs it on power lines 152*p*, 152*g*. Direct current voltage V2 for power lines 152*p*, 152*g* is controlled to have a voltage command value Vr2 by controlling turning on/off switching elements Q1 to Q8 configuring the second and third full bridge circuits. Voltage command value Vr2 is set at a voltage level (a charging voltage Vsb) suitable for charging auxiliary battery 70.

Sub charging relays SCR1 and SCR2 turned on allow auxiliary battery 70 to be charged directly by voltage (V2) that charging device 200 outputs on power lines 152*p* and 152*g*. In other words, generally, when the auxiliary battery is charged, power lines 152*p* and 152*g* will have voltage (V2) controlled to be lower than when the external charging is performed.

When the auxiliary battery is charged, power conversion unit 240 is inactivated. In other words, switching elements Q9-Q13 are held off.

Preferably, electrically powered vehicle 5 further includes a DC/DC converter 280 as an additional configuration for charging auxiliary battery 70. DC/DC converter 280 is electrically connected between power lines 153*p*, 153*g* and the positive and negative electrode terminals of auxiliary battery 70. DC/DC converter 280 corresponds to a "power converter."

DC/DC converter 280 is controlled in response to a control signal CS3 issued from control device 100. DC/DC converter 280 outputs voltage controlled to be voltage Vsb applied to charge auxiliary battery 70.

DC/DC converter 280 is not of large capacity for supplying power that is consumed by an auxiliary load; rather, it is of small capacity dedicated to charging auxiliary battery 70. At least, the power charged to auxiliary battery 70 via DC/DC converter 280 is smaller than that charged in an operation done by charging device 200 to charge the auxiliary battery. Accordingly, a loss that is caused at DC/DC converter 280 is also smaller than that caused at a DC/DC converter described in PTDs 1-3 for supplying power that is consumed by an auxiliary load. DC/DC converter 280 allows the external charging to be performed with auxiliary battery 70 charged in parallel with charging main battery 10.

Reference will now be made to the FIG. 2 flowchart to describe a control process for charging main battery 10 and auxiliary battery 70 in the power supply apparatus of the electrically powered vehicle of the first embodiment as described above.

The FIG. 2 flowchart and those described hereinafter indicate processes having steps, which are performed through hardware processing and/or software processing done by control device 100. Furthermore, each flowchart represents a control process performed by control device 100 periodically as predetermined.

Figure 2:
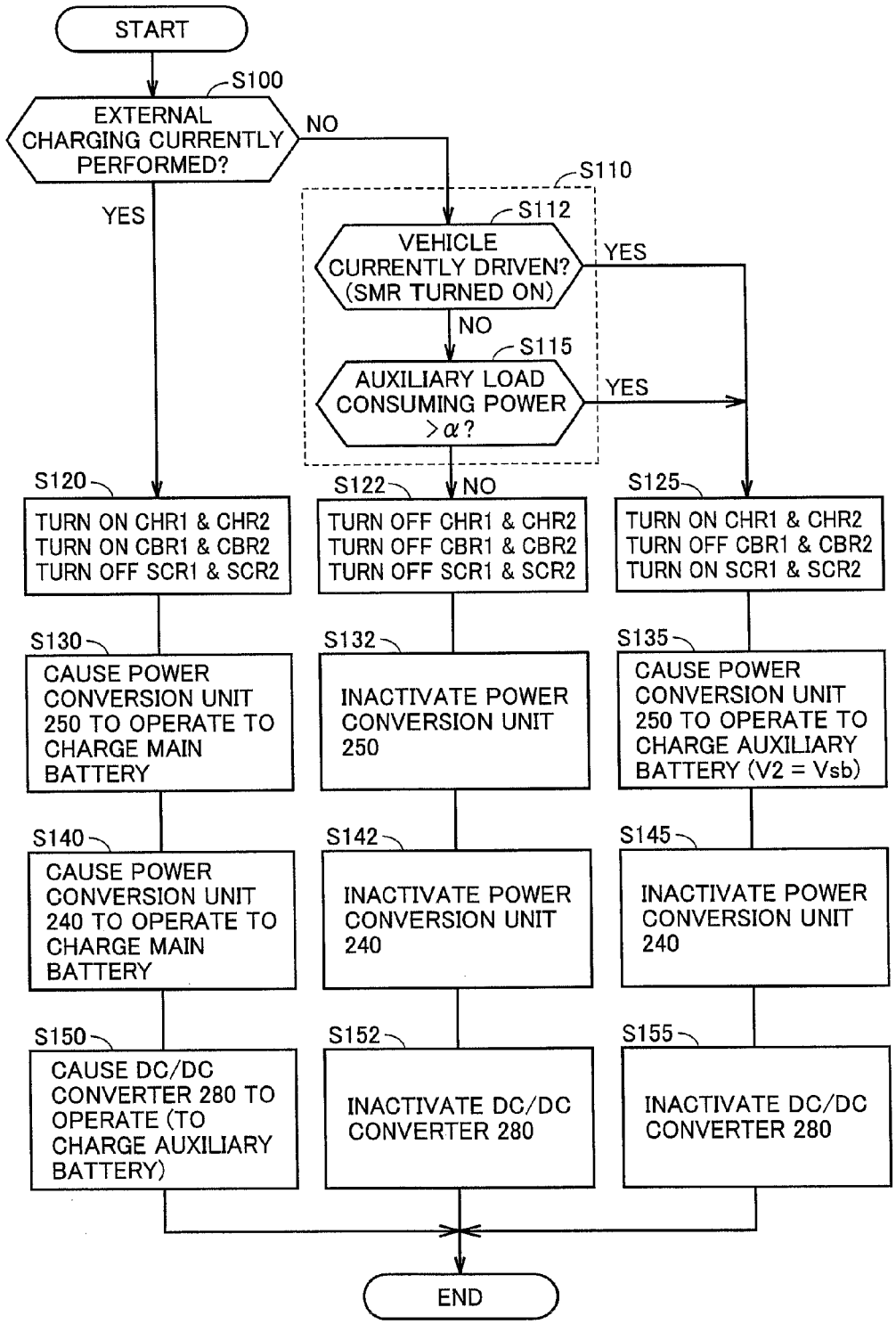
FIG. 2 is a flowchart for illustrating a control process for charging a main battery and an auxiliary battery in the power supply apparatus of the electrically powered vehicle of the first embodiment.

With reference to FIG. 2, control device 100 in step S100 determines whether the vehicle is currently externally charged. When a predetermined condition is established for starting the external charging, and accordingly, the external charging starts, a decision of YES is made in step S100. Once the external charging has started, the external charging continues until a predetermined condition is established for ending the external charging. Until the external charging ends, a decision of YES is made in step S100.

For example, the condition for starting the external charging is established responsively for example when external power supply 400 is normally connected to electrically powered vehicle 5 via charging cable 410 and in that condition the user inputs an instruction to charge a battery or a time to start charging a battery arrives as previously indicated by the user. The condition for ending the external charging is established responsively for example when main battery 10 has attained a state of charge (SOC) of a target value or it has been charged for a predetermined period of time or with a predetermined amount of power.

Control device 100 in the external charging (YES in S100) performs steps S120, S130, S140, and S150, as follows:

Specifically, control device 100 in step S120 turns on main charging relays CHR1 and CHR2 and connection relays CBR1 and CBR2. On the other hand, sub charging relays SCR1 and SCR2 are turned off.

Control device 100 in steps S130 and S140 controls power conversion unit 240 and power conversion unit 250 to perform an operation to charge main battery 10. Thus the above described AC/DC conversion (or the first power conversion) is performed to convert alternating current power that is received from external power supply 400 into (direct current) power to charge main battery 10. Then, main battery 10 is charged via main charging relays CHR1 and CHR2 by direct current voltage (V3) output by charging device 200 on power lines 153p and 153g.

Furthermore, control device 100 in step S150 operates DC/DC converter 280. DC/DC converter 280 buck-boosts direct current voltage (V3) on power line 153p and 153g to voltage Vsb to charge auxiliary battery 70. DC/DC converter 280 thus outputs voltage and thereby auxiliary battery 70 is charged in parallel with charging main battery 10.

In contrast, when the external charging is not performed (NO in S100), control device 100 proceeds to step S110 to determine whether it is necessary to charge auxiliary battery 70 from in what condition an auxiliary load operating on power received from the auxiliary battery operates.

For example, step S110 includes step S112 to determine whether electrically powered vehicle 5 is currently driven, and step S115 to determine whether an auxiliary load's total load power is larger than a predetermined threshold value (α).

In step S112 control device 100 determines whether electrically powered vehicle 5 is currently driven. For example, if system main relays SMR1 and SMR2 are turned on, each auxiliary load needs to operate immediately in response to the user's operation. Accordingly, in order to ensure sufficient power for auxiliaries to consume, control device 100 makes a decision of YES in step S112.

In step S115, control device 100 determines whether the auxiliary load currently consumes power larger than predetermined threshold value (α). Thus, if electrically powered vehicle 5 is not driven (NO in S112), and an air-conditioner, illumination equipment, audio equipment and/or the like in operation consume(s) large power, control device 100 makes a decision of YES in step S115.

For YES in step S112 or S115, control device 100 makes a decision of YES in step S110 and determines that the auxiliary battery is in a condition which requires charging. For NO in steps S112 and S115, control device 100 makes a decision of NO in step S110 and determines that the auxiliary battery is not in the condition that requires charging.

If control device 100 determines that auxiliary battery 70 is in the condition that requires charging (YES in S110), then steps S125, S135, S145, and S155 are performed to charge auxiliary battery 70.

Control device 100 in step S125 turns on main charging relays CHR1 and CHR2 and sub charging relays SCR1 and SCR2, while control device 100 turns off connection relays CBR1 and CBR2.

Thus, voltage output from main battery 10 is transmitted to power lines 153p and 153g. Furthermore, an electric conduction path is provided between nodes N1, N2 in charging device 200 and auxiliary battery 70. On the other hand, external power supply 400 is electrically disconnected from charging device 200 by connection relays CBR1 and CBR2.

Control device 100 in step S135 controls power conversion unit 250 to perform an operation to charge the auxiliary battery. Then, control device 100 in step S145 inactivates power conversion unit 240. Thus the above described DC/DC conversion (or the second power conversion) is performed to convert direct current voltage that is received from main battery 10 into voltage applied to charge auxiliary battery 70. Then, auxiliary battery 70 is charged by direct current voltage (V2=Vsb) output by power conversion unit 250 on power lines 152p and 152g.

Control device 100 in step S155 inactivates DC/DC converter 280. This is because DC/DC converter 280 is of small capacity dedicated to charging auxiliary battery 70 and accordingly, has only a small effect in ensuring power that is consumed by auxiliaries. It should be noted, however, that when the external charging is not performed and the auxiliary battery is charged, DC/DC converter 280 may be operated and charging device 200 (or power conversion unit 250) and DC/DC converter 280 may both be used to supply power to charge auxiliary battery 70.

If control device 100 determines that the auxiliary battery is not in the condition that requires charging (NO in S110), control device 100 then performs steps S122, S132, S142, and S152.

Control device 100 in step S122 turns off main charging relays CHR1 and CHR2, sub charging relays SCR1 and SCR2, and connection relays CBR1 and CBR2.

Furthermore, control device 100 in steps S132 and S142 inactivates both power conversion units 240 and 250. Furthermore, control device 100 in step S150 inactivates DC/DC converter 280.

Accordingly, in steps S122, S132, S142 and S152, no path is formed to charge auxiliary battery 70 from main battery 10. Note that when the external charging is not performed and from this condition an auxiliary load is driven and consumes large power, a decision of YES is made in step S110. Accordingly, steps S125, S135, S145, and S155 are performed to start charging auxiliary battery 70. In other words, power that is consumed by the auxiliary load will be supplied from a source provided by power of main battery 10.

The power supply apparatus for the electrically powered vehicle in the first embodiment thus allows auxiliary battery 70 to be charged through power conversion opposite in direction to that in the external charging by sharing at least a portion in configuration of charging device 200 used for the external charging. In particular, when the auxiliary battery is charged, nodes N1 and N2 (in FIG. 1, power lines 152p and 152g) to which sub charging relays SCR1 and SCR2 are connected can have voltage controlled to have a level in voltage different from that in the external charging so that auxiliary battery 70 can be charged by voltage (Vsb) output by charging device 200 directly.

As a result, a power converter that converts voltage that is output from main battery 10 into voltage applied to charge auxiliary battery 70 to ensure power consumed by an auxiliary load (i.e., a DC/DC converter of large capacity), as described in PTDs 1-3, can be dispensed with. This allows a power supply apparatus including main battery 10 and auxiliary battery 70 to be reduced in size and produced at reduced cost.

Furthermore, DC/DC converter 280 of small capacity additionally provided to charge auxiliary battery 70 in the external charging allows the external charging to be performed with auxiliary battery 70 charged in parallel with charging main battery 10. This can provide more opportunities to charge auxiliary battery 70.

Second Embodiment

Figure 3:
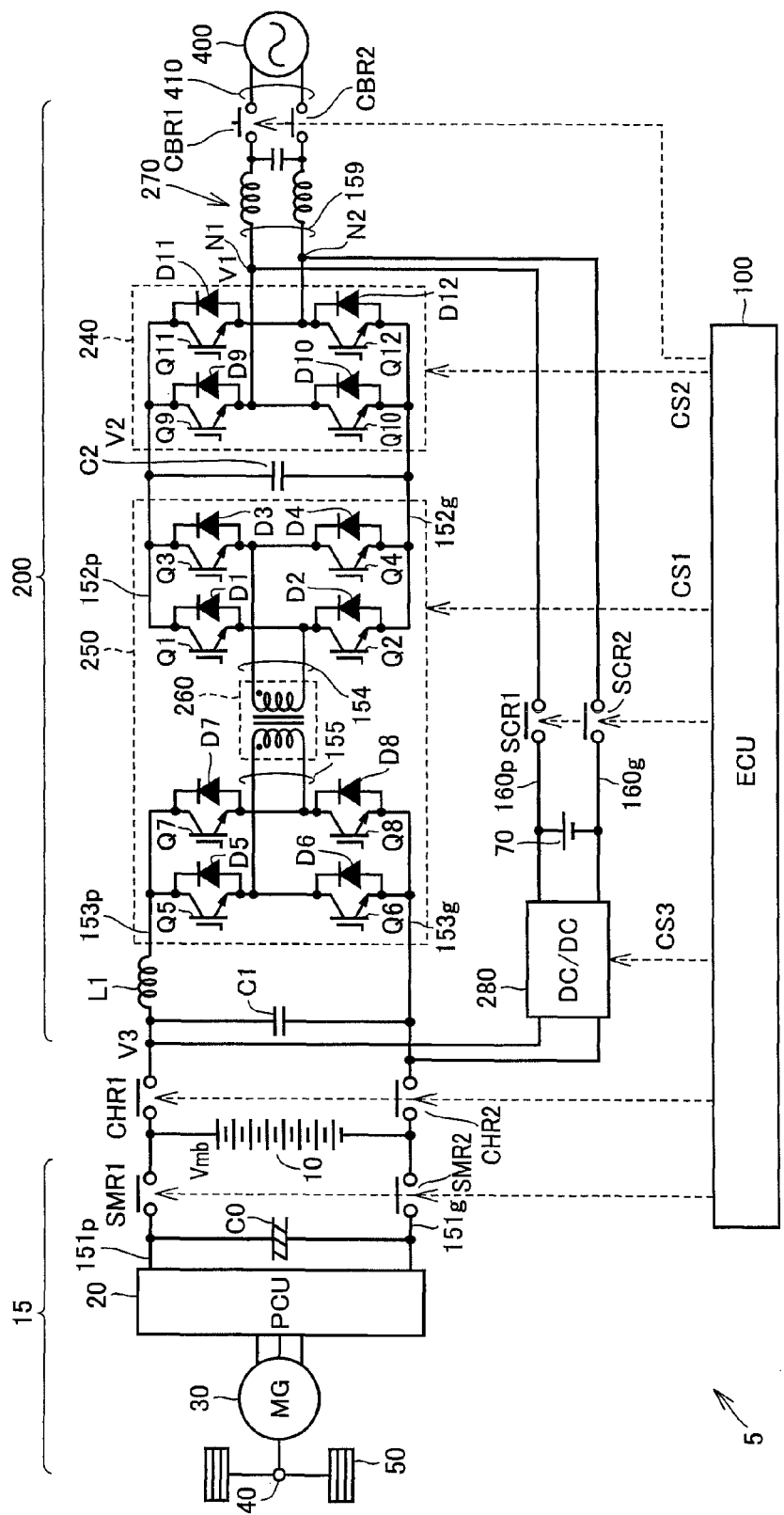
FIG. 3 is a circuit diagram showing a configuration of a power supply apparatus for an electrically powered vehicle in accordance with a second embodiment of the present invention.

FIG. 3 is a circuit diagram showing a configuration of a power supply apparatus for an electrically powered vehicle in accordance with a second embodiment of the present invention.

When FIG. 3 is compared with FIG. 1, the second embodiment provides a power supply apparatus for an electrically powered vehicle that is different from that of the first embodiment by nodes N1, N2 to which sub charging relays SCR1 and SCR2 are connected. Specifically, the second embodiment provides a power supply apparatus for an electrically powered vehicle with nodes N1, N2 provided on power line 159.

The power supply apparatus has a remainder that is similar in configuration to that of the first embodiment, and accordingly, will not be described repeatedly in detail.

Figure 4:
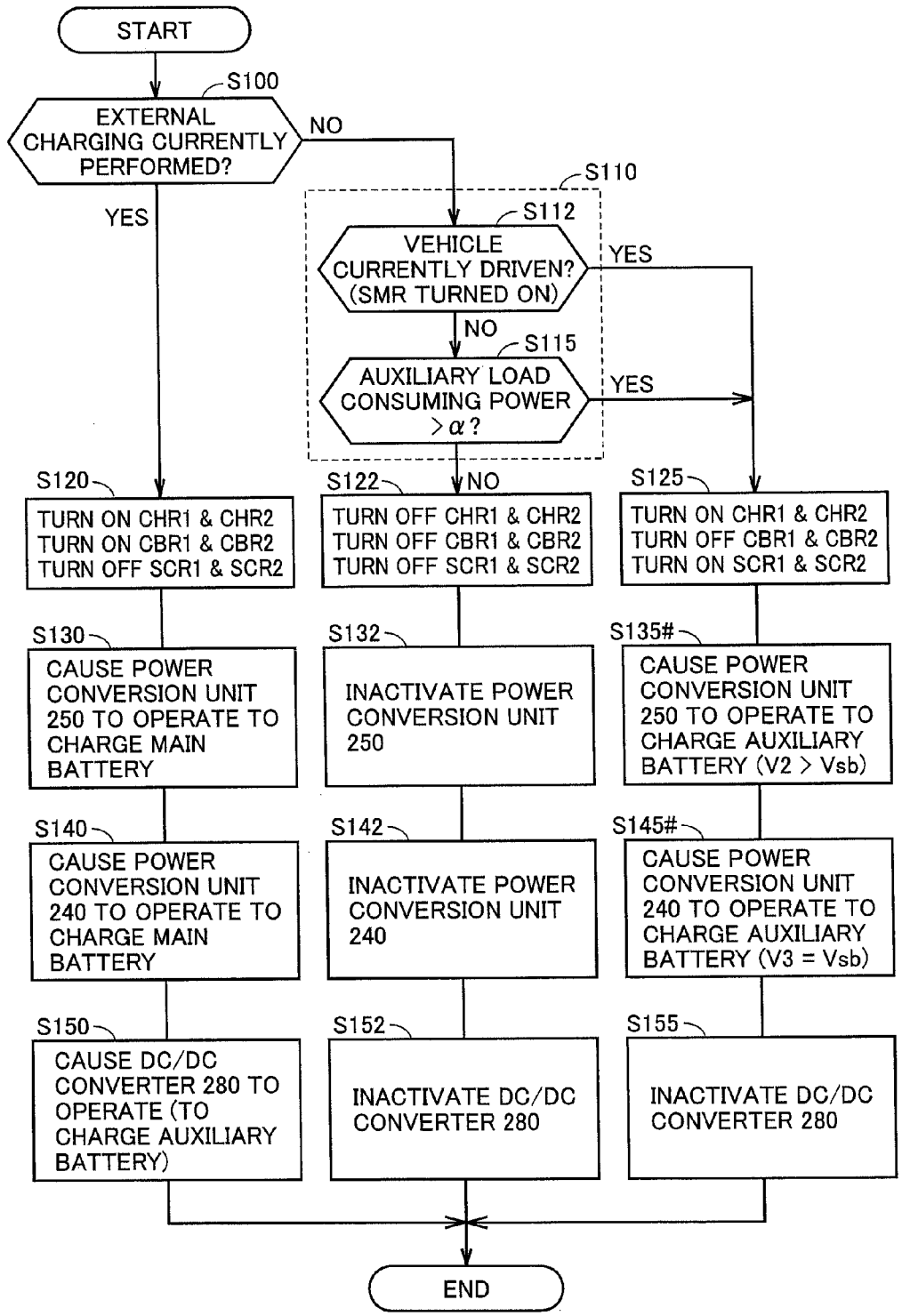
FIG. 4 is a flowchart for illustrating a control process for charging a main battery and an auxiliary battery in the power supply apparatus of the electrically powered vehicle of the second embodiment.

FIG. 4 is a flowchart for illustrating a control process for charging a main battery and an auxiliary battery in the power supply apparatus for the electrically powered vehicle in the second embodiment.

With reference to FIG. 4, the second embodiment provides a power supply apparatus for an electrically powered vehicle such that control device 100 in charging the auxiliary battery (YES in S110) does not perform steps S135 and S145 (see FIG. 2) and instead performs steps S135# and S145# to control charging device 200. Steps S125 and S155 are similar to those in FIG. 2, and accordingly, will not be described repeatedly.

Control device 100 in steps S135# and S145# controls power conversion units 240 and 250 to perform an operation to charge the auxiliary battery. Specifically, power conversion unit 250 buck-boosts direct current voltage received from main battery 10, and outputs the buck-boosted voltage on power lines 152p and 152g (S135#). At the time, power lines 152p and 152g have voltage (V2) smaller than voltage (Vmb) output from main battery 10 and larger than voltage (Vsb) applied to charge auxiliary battery 70 (i.e., Vmb>V2>Vsb). Furthermore, power conversion unit 240 converts voltage (V2) on power lines 152p and 152g into voltage (Vsb) applied to charge auxiliary battery 70, and outputs the converted voltage on power line 159 (S145#).

Thus, while power conversion unit 240 in the external charging performs an AC/DC conversion operation from power line 159 toward power lines 152p and 152g power conversion unit 240 in an operation to charge the auxiliary battery performs DC/DC conversion from power lines 152p and 152g towards power line 159.

Thus power conversion units 240 and 250 perform DC/DC conversion to convert direct current voltage that is received from main battery 10 into voltage applied to charge auxiliary battery 70 (i.e., the second power conversion).

When the external charging is performed, a process (of steps S125, S135, S145, S155) is performed similarly as has been described with reference to FIG. 2, and when it is unnecessary to charge the auxiliary battery, a process (of steps S122, S132, S142, S152) is performed similarly as has been described with reference to FIG. 2. Accordingly, they will not be described repeatedly.

Thus the power supply apparatus for the electrically powered vehicle in the second embodiment, as well as that in the first embodiment, allows auxiliary battery 70 to be directly charged through power conversion opposite in direction to that in the external charging by sharing the configuration of charging device 200 used for the external charging. This allows a power supply apparatus including main battery 10 and auxiliary battery 70 to be reduced in size and produced at reduced cost.

Furthermore in the second embodiment the power supply apparatus in charging auxiliary battery 70 allows power conversion units 240 and 250 to be both operated to perform DC/DC conversion (or buck-boosting) and can better regulate voltage applied to charge auxiliary battery 70.

Third Embodiment

As has been described in the first and second embodiments, charging device 200 charges main battery 10 and auxiliary battery 70 selectively. Accordingly, DC/DC converter 280 of small capacity has been described as a configuration for charging auxiliary battery 70 in parallel with charging main battery 10 in the external charging. A third embodiment will be described for a variation of a circuit configuration for charging the auxiliary battery in the external charging.

Figure 5:
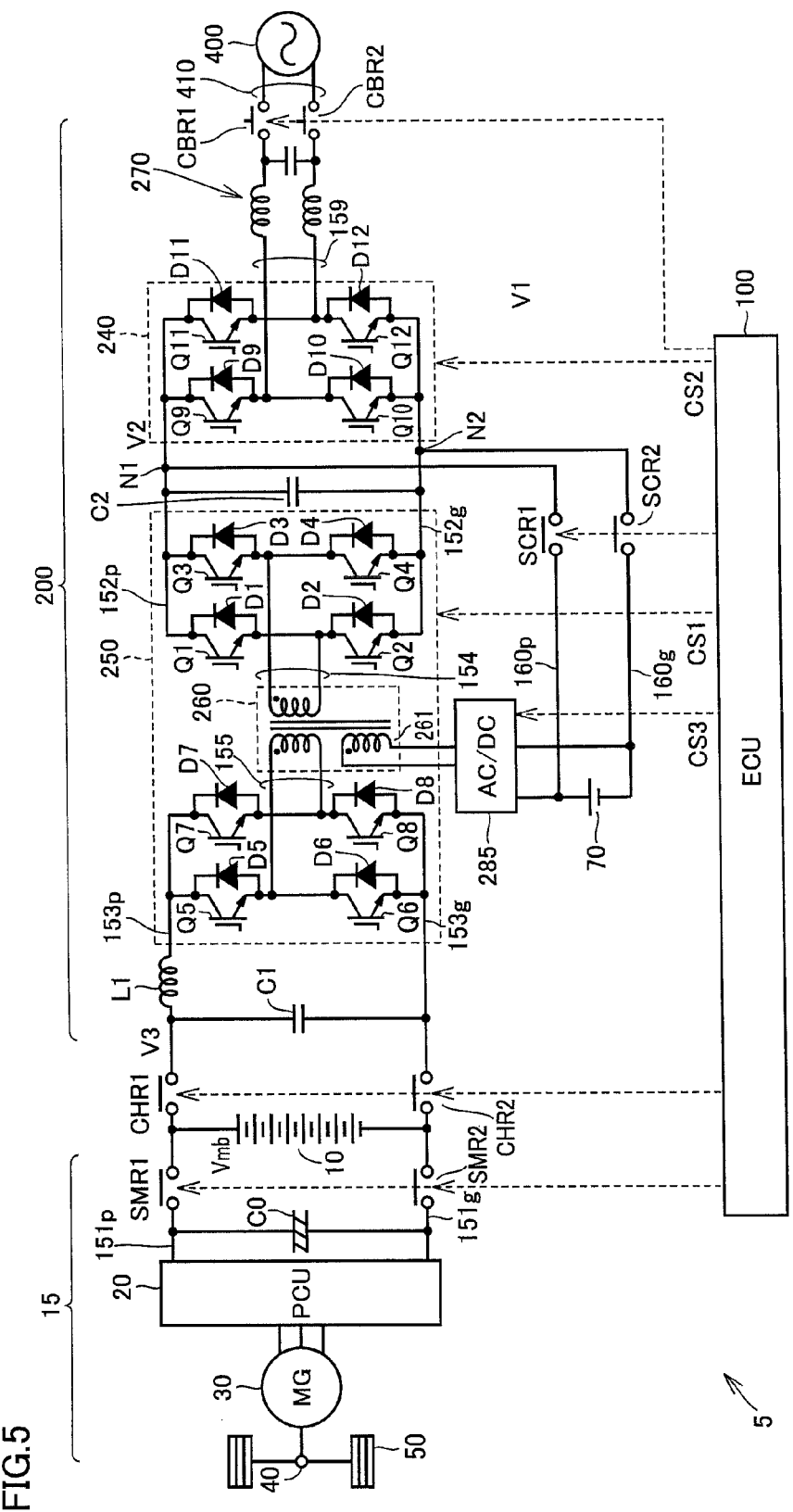
FIG. 5 is a circuit diagram showing a configuration of a power supply apparatus for an electrically powered vehicle in accordance with a third embodiment of the present invention.

FIG. 5 is a circuit diagram showing a configuration of a power supply apparatus for an electrically powered vehicle in the third embodiment of the present invention.

When FIG. 5 is compared with FIG. 1, the third embodiment provides a power supply apparatus for an electrically powered vehicle, that has DC/DC converter 280 replaced with an AC/DC converter 285. The FIG. 5 power supply apparatus has a remainder similar in configuration to that of the first embodiment (see FIG. 1), and accordingly, will not be described repeatedly in detail. As well as DC/DC converter 280, AC/DC converter 285 is of relatively small capacity. In other words, as well as DC/DC converter 280, AC/DC converter 285 corresponds to a "power converter".

AC/DC converter 285 is connected to a node on a power conversion path in charging device 200, that can extract alternating current power. In the FIG. 5 example, AC/DC converter 285 is connected between a coil winding 261 of isolation transformer 260 and auxiliary battery 70.

Coil winding 261 can be formed by further providing isolation transformer 260 of FIG. 1 with a tap. Alternatively, power line 154 or 155 may be shared to provide coil winding 261. In other words, AC/DC converter 285 may be connected between power line 154 or 155 and auxiliary battery 70.

AC/DC converter 285 converts high-frequency alternate current voltage that is generated in isolation transformer 260 into voltage (Vsb) applied to charge auxiliary battery 70. Accordingly, AC/DC converter 285, as well as DC/DC converter 280 shown in FIG. 1, can charge auxiliary battery 70 at least in the external charging.

Figure 6:
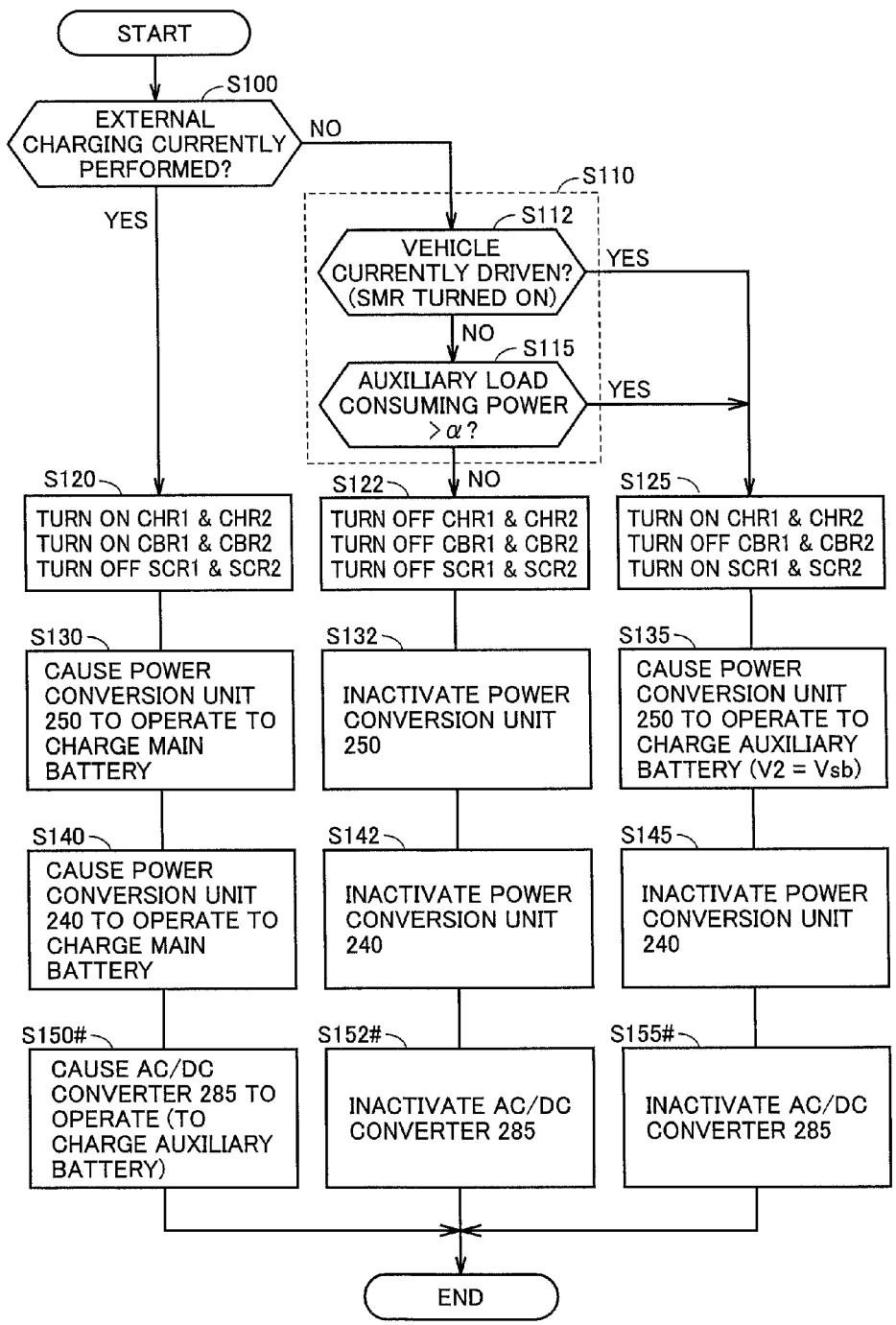
FIG. 6 is a first flowchart for illustrating a control process for charging a main battery and an auxiliary battery in the power supply apparatus of the electrically powered vehicle of the third embodiment.

FIG. 6 is a flowchart for illustrating a control process for charging a main battery and an auxiliary battery in the power supply apparatus for the electrically powered vehicle in the third embodiment.

When FIG. 6 is compared with FIG. 2, the third embodiment provides a power supply apparatus for an electrically powered vehicle such that control device 100 does not perform steps S150, S152, and S155 (see FIG. 2) and instead performs steps S150#, S152#, and S155#.

How control device 100 controls each relay (see steps S120, S122, S125) and power conversion units 240, 250 (see steps S130, S132, S135, S140, S142, S145) is similar to that shown in FIG. 2, and accordingly, will not be described repeatedly.

Control device 100 in the external charging proceeds to step S150# to activate AC/DC converter 285 to charge auxiliary battery 70. In contrast, when the external charging is not performed and it is unnecessary to charge the auxiliary battery (NO in S110), control device 100 proceeds to step S152# to inactivate AC/DC converter 285.

Furthermore, when the external charging is not performed and it is necessary to charge the auxiliary battery (YES in S110), control device 100 proceeds to step S155# to basically inactivate AC/DC converter 285. Note that, as has been described for step S155 (see FIG. 2), AC/DC converter 285 may be operated and charging device 200 and AC/DC converter 285 may both be used to charge auxiliary battery 70.

Thus the third embodiment provides a power supply apparatus for an electrically powered vehicle, that includes AC/DC converter 285 to also allow the external charging to be performed with auxiliary battery 70 charged in parallel with charging main battery 10.

Note that it is also possible to provide in the FIG. 5 configuration on power line 159 nodes N1 and N2 to which sub charging relays SCR1 and SCR2 are connected, as shown in FIG. 3 (for the second embodiment). In that case, the main battery and the auxiliary battery are charged through a control process performed according to the flowchart shown in FIG. 7.

Figure 7:
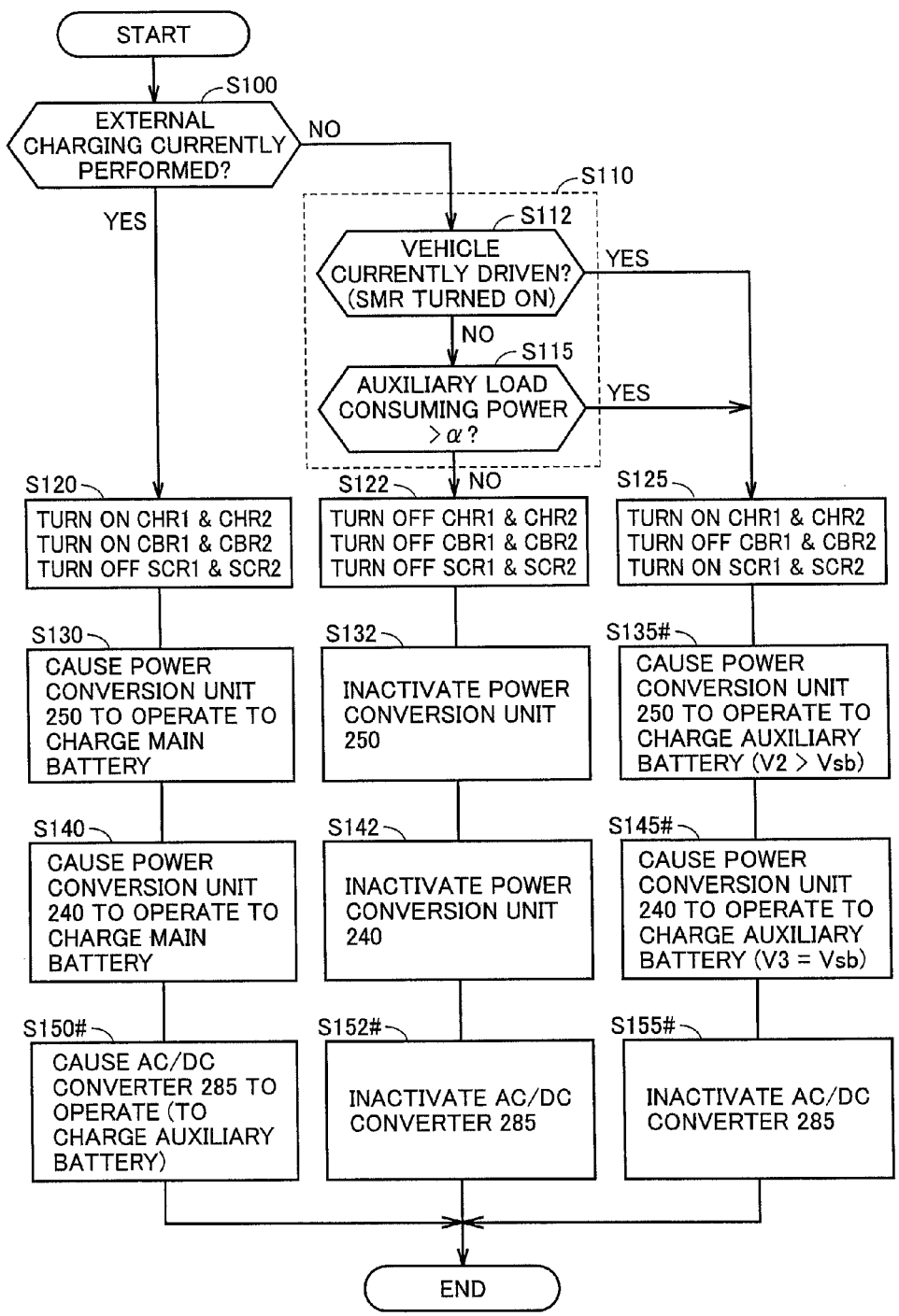
FIG. 7 is a second flowchart for illustrating a control process for charging the main battery and the auxiliary battery in the power supply apparatus of the electrically powered vehicle of the third embodiment.

When FIG. 7 is compared with FIG. 6, with sub charging relays SCR1 and SCR2 connected to power line 159, control device 100 does not perform the FIG. 6 steps S135 and S145 and instead performs the FIG. 4 steps S135# and S145#. The other steps are similar to those in FIG. 6, and accordingly, will not be described repeatedly.

Thus the power supply apparatus of any of the first embodiment (see FIG. 1) and the second embodiment (see FIG. 3) with DC/DC converter 280 replaced with AC/DC converter 285 also allows the external charging to be performed with auxiliary battery 70 charged in parallel with charging main battery 10.

Third Embodiment in Exemplary Variation

Figure 8:
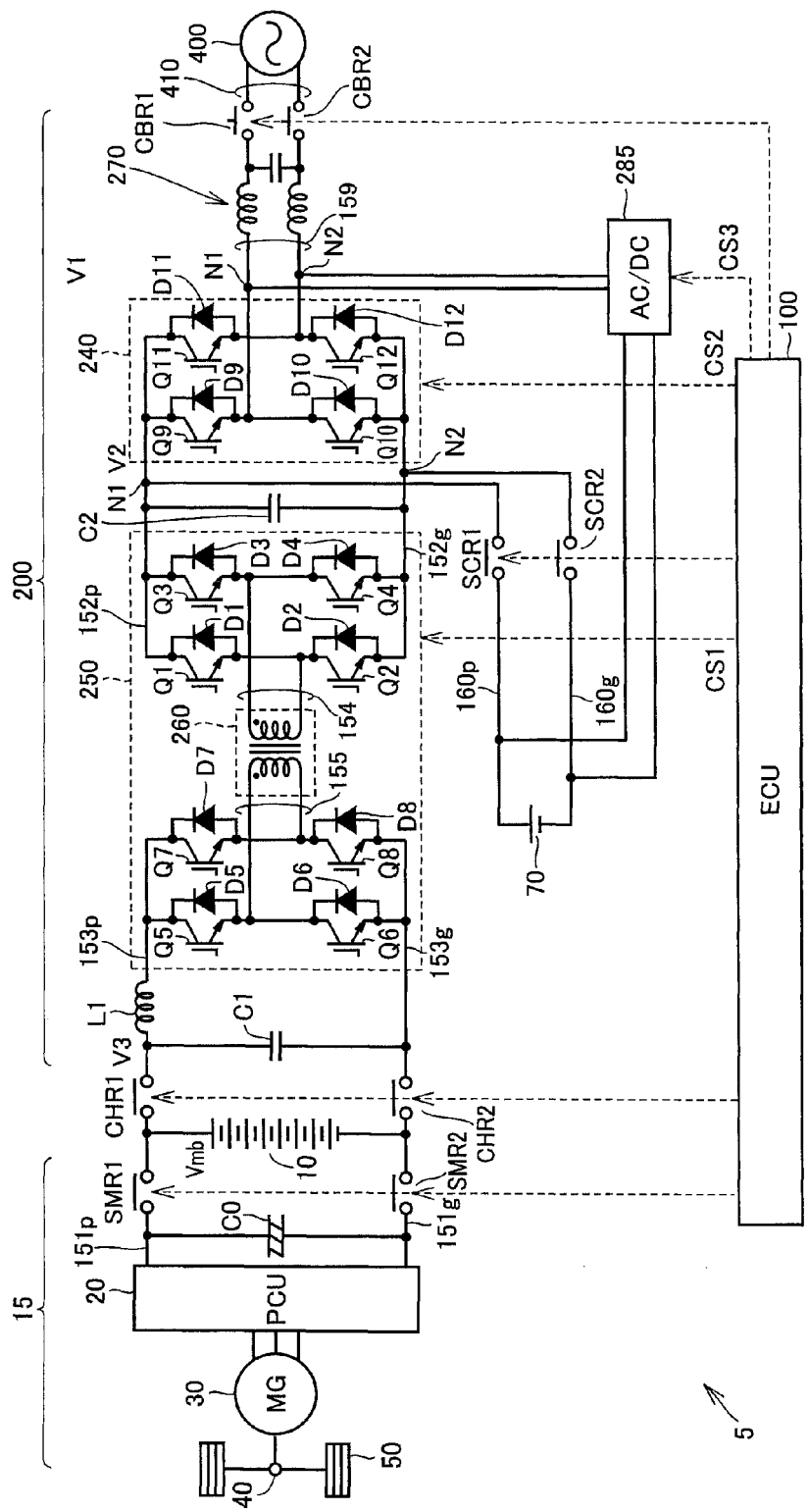
FIG. 8 is a circuit diagram showing a configuration of a power supply apparatus for an electrically powered vehicle in accordance with an exemplary variation of the third embodiment of the present invention.

FIG. 8 is a circuit diagram showing a configuration of a power supply apparatus for an electrically powered vehicle in accordance with an exemplary variation of the third embodiment.

When FIG. 8 is compared with FIG. 5, the third embodiment in the exemplary variation provides a power supply apparatus for an electrically powered vehicle, that has AC/DC converter 285 at a position different from that in the third embodiment (see FIG. 5). Specifically, AC/DC converter 285 is connected between power line 159 and auxiliary battery 70. As a result, isolation transformer 260 can dispense with coil winding 261 (see FIG. 5). FIG. 8 shows a remainder similar in configuration to that of FIG. 5, and accordingly, it will not be described repeatedly.

Power line 159 in the external charging receives alternate current voltage from external power supply 400. Accordingly, AC/DC converter 285 in the external charging converts alternating current voltage on power line 159 into voltage (Vsb) applied to charge auxiliary battery 70. Thus auxiliary battery 70 can be charged while the external charging is performed.

In the third embodiment in the exemplary variation the power supply apparatus for an electrically powered vehicle allows main battery 10 and auxiliary battery 70 to be charged through a control process similar to that shown in the FIG. 6 flowchart.

Furthermore, it is also possible in the FIG. 8 configuration to connect sub charging relays SCR1 and SCR2 between power line 159 and auxiliary battery 70 similarly as done in the second embodiment (see FIG. 3). In that case, a control process similar to that in the FIG. 7 flowchart can be employed to charge main battery 10 and auxiliary battery 70.

It should be noted, however, that when the external charging is not performed, no alternating current voltage is generated on power line 159 in any of the first embodiment (see FIG. 1) and the second embodiment (see FIG. 3). Accordingly, in step S155#, it is understood that there is no scope to operate AC/DC converter 285.

Thus, AC/DC converter 285 can be connected to any node on a power conversion path in charging device 200 in the external charging, that can extract alternating current power.

Fourth Embodiment

The first to third embodiments and their exemplary variations present power supply apparatuses for an electrically powered vehicle, that in the external charging cannot charge auxiliary battery 70 by charging device 200. If small-capacity DC/DC converter 280 or AC/DC converter 285 should be introduced, it is difficult to sufficiently supply power that is consumed by auxiliaries.

Accordingly, when the external charging is performed and the user also uses an air conditioner, illumination equipment, audio equipment and/or the like in the vehicle and accordingly, auxiliaries consume large power, auxiliary battery 70 may be reduced in SOC. If auxiliary battery 70 outputs significantly reduced voltage, the ECU may not be started or the like, and causing the vehicle to travel may not be started smoothly.

Accordingly a fourth embodiment will be described for how charging is controlled in the external charging when auxiliaries consume large power. The fourth embodiment provides a control process that can be applied to the power supply apparatuses for an electrically powered vehicle that have been described above in the first to third embodiments and their exemplary variations.

Figure 9:
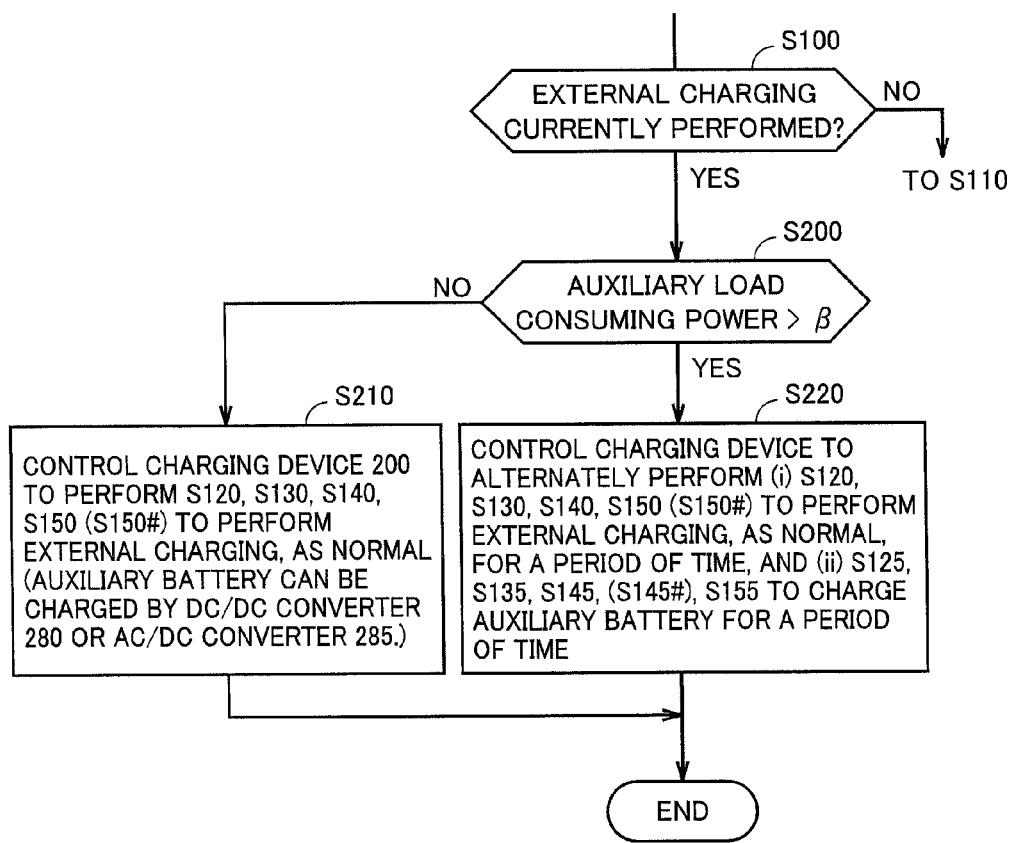
FIG. 9 is a flowchart for illustrating a control process for charging a main battery and an auxiliary battery in a fourth embodiment.

FIG. 9 is a flowchart for illustrating a control process for charging a main battery and an auxiliary battery in the power supply apparatus for the electrically powered vehicle in the fourth embodiment.

With reference to FIG. 9, control device 100 in the external charging (YES in S100) does not perform steps S120-S150 (see FIG. 2 or the like) and instead performs the following steps S200-S220. When the external charging is not performed (NO in S100), a control process similar to that in the FIG. 2 flowchart or the like is performed, and accordingly, will not be described repeatedly.

Control device 100 in step S200 determines whether during the external charging, an auxiliary load consumes power larger than a predetermined threshold value ($\beta$).

If not (NO in S200), control device 100 proceeds to step S210 to perform steps S120, S130, S140, S150 (S150#), as described above, to perform the external charging as normal. In other words, charging device 200 performs AC/DC conversion to convert alternating current voltage that is received from external power supply 400 into voltage (Vmb) applied to charge main battery 10. Furthermore, preferably, small-capacity DC/DC converter 280 or AC/DC converter 285 operates to charge auxiliary battery 70.

In contrast, if the auxiliary load consumes large power (YES in S200), control device 100 proceeds to step S220. In step S220 control device 100 controls charging device 200 to alternately provide (i) a period of the external charging as normal, similarly as done in step S210, and (ii) a period of charging the auxiliary battery while the external charging is ceased, as done in steps S125, S130, S145 (S145#), and S155 as described above.

Thus in the external charging when an auxiliary load consumes large power, the external charging is not continued alone; rather, the external charging is interrupted and auxiliary battery 70 is charged with power of main battery 10 for a period of time. This can prevent auxiliary battery 70 from having a reduced charged level while the external charging is performed.

It should be noted that charging device 200 is not limited in configuration to the first to third embodiments and their exemplary variations, and any circuit configuration is applicable that can provide bidirectional power conversion required in the external charging and the charging of the auxiliary battery.

Figure 10:
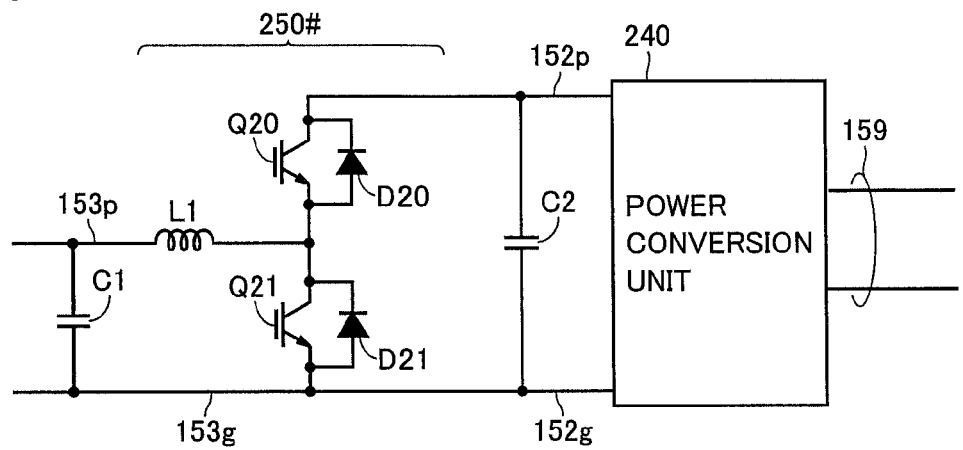
FIG. 10 is a circuit diagram showing a first exemplary variation in configuration of a power conversion unit.
Figure 11:
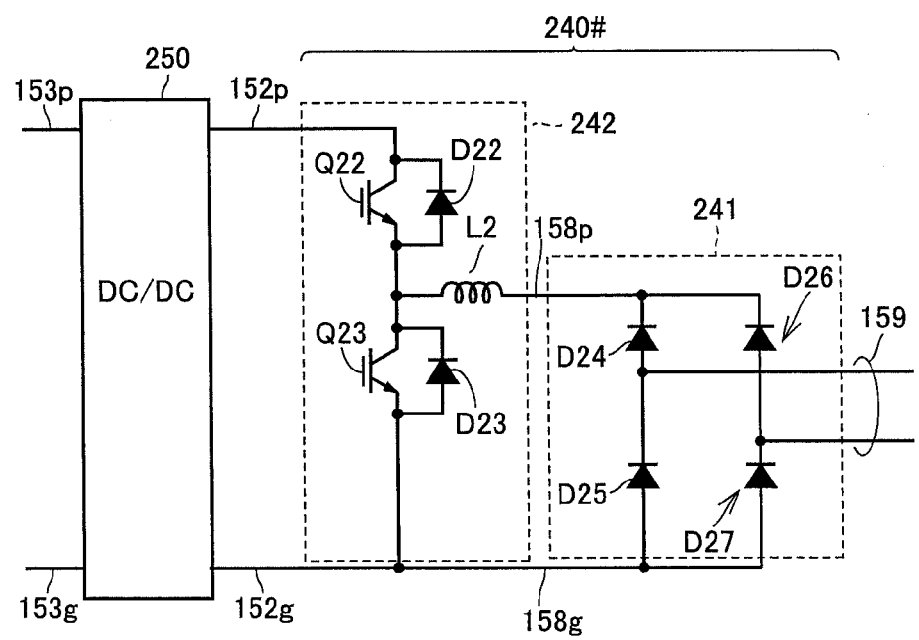
FIG. 11 is a circuit diagram showing a second exemplary variation in configuration of the power conversion unit.

As an example, FIG. 10 and FIG. 11 show an exemplary variation of power conversion units 240 and 250 shown in the first to third embodiments and their exemplary variations.

FIG. 10 shows an exemplary variation of power conversion unit 250.

With reference to FIG. 10, the exemplary variation provides a power conversion unit 250# having a configuration of a non-insulated type chopper circuit, rather than an insulated type full bridge circuit shown for example in FIG. 1. Specifically, power conversion unit 250# includes switching elements Q20, Q21 and reactor L1. Switching element Q20 is electrically connected between power line 152p and power line 153p. Switching element Q21 is electrically connected between switching element Q20 and power line 153g. Antiparallel diodes D20 and D21 are connected to switching elements Q20 and Q21. Power lines 152g and 153g are electrically not insulated and serve as a shared line.

Thus, power conversion unit 250# utilizes smoothing reactor L1 connected to power line 153p to configure a chopper circuit with a bidirectional current. Power conversion unit 250# can perform bidirectional DC/DC conversion between direct current voltage (V3) on power lines 153p and 153g and direct current voltage (V2) on power lines 152p and 152g. The DC/DC conversion is performed with a voltage ratio (V3/V2), which is known to be controllable by a duty ratio applied to switch on/off switching elements Q20, Q21 within a predetermined switching period complementarily.

Accordingly, power conversion unit 250# can also be employed to handle both DC/DC conversion in the external charging and that in the charging of the auxiliary battery through controlling a duty ratio as described above. Thus, power conversion unit 250# can be used in the first to fourth embodiments in place of power conversion unit 250.

FIG. 11 shows an exemplary variation of power conversion unit 240.

With reference to FIG. 11, the exemplary variation provides a power conversion unit 240# including a diode bridge 241 and a chopper circuit 242 in place of the full bridge circuit shown for example in FIG. 1.

Diode bridge 241 is configured of diodes D24-D27. Diode bridge 241 provides full wave rectification of alternating current voltage on power line 159 and outputs it on power lines 158p and 158g.

Chopper circuit 242 has switching elements Q22 and Q23 connected in series between power lines 152p and 152g, and a reactor L2. Antiparallel diodes D22 and D23 are connected to switching elements Q22 and Q23. Chopper circuit 242 is similar in configuration and operation to power conversion unit 250# shown in FIG. 10, and accordingly, will not be described repeatedly. In other words, chopper circuit 242 performs bidirectional direct current voltage conversion between power lines 152p, 152g and power lines 158p, 158g.

Power conversion unit 240# can receive alternating current voltage from external power supply 400 via power line 159, rectify it by diode bridge 241, and furthermore, subject it by chopper circuit 262 to direct current voltage conversion to control direct current voltage (V2) for power lines 152p and 152g. Power conversion unit 240#, as well as power conversion unit 240, can thus perform AC/DC conversion required in the external charging.

On the other hand, power conversion unit 240# can buck-boost direct current voltage (V2) on power lines 152p and 152g to voltage (Vsb) applied to charge auxiliary battery 70, and power conversion unit 240# can outputs it on power lines 158p and 158g. Power conversion unit 240#, as well as power conversion unit 240, can thus perform DC/DC conversion required in charging the auxiliary battery in the configuration of the second embodiment (see FIG. 3).

If power conversion unit 240# is used in the configuration of the second embodiment (see FIG. 3), it is necessary to provide nodes N1 and N2 on power lines 158p and 158g rather than power line 159. Thus, when sub charging relays SCR1 and SCR2 are turned on, auxiliary battery 70 is charged by direct current voltage on power lines 158p and 158g.

Thus, power conversion unit 240# can be used in the first to fourth embodiments in place of power conversion unit 240.

Furthermore in the first to third embodiments and their exemplary variations a configuration subsequent to power lines 151p, 151g (or a vehicular travelling system) is not limited to that shown in the figures. That is, as has been described above, the present invention is applicable to electrically powered vehicles equipped with traction motor(s), such as an electric vehicle, a hybrid vehicle, a fuel cell vehicle, and the like.

It should be understood that the embodiments disclosed herein are illustrative and non-restrictive in any respect. The scope of the present invention is defined by the terms of the claims, rather than by the foregoing description, and is intended to include any modifications within the scope and meaning equivalent to the terms of the claims.

INDUSTRIAL APPLICABILITY

The present invention is applicable to electrically powered vehicles configured to be capable of charging an in-vehicle power storage device by an external power supply.

REFERENCE SIGNS LIST

10: main battery; 30: traction motor; 30: motor generator; 40: power transmission gear; 50: driving wheel; 60, 280, 285: converter; 70: auxiliary battery; 100: control device (ECU); 151g, 151p, 152g, 152p, 153g, 153p, 154, 155, 159, 160p, 160g: power line; 200: charging device; 240, 250: power conversion unit; 241: diode bridge; 242, 262: chopper circuit; 260: isolation transformer; 261: coil winding; 270: LC filter; 280: DC/DC converter (of small capacity); 285: AC/DC converter (of small capacity); 400: external power supply; 410: charging cable; C0, C1, C2: smoothing capacitor; CBR1, CBR2: connection relay; CHR1, CHR2: main charging relay; CS1-CS3: control signal; D1-D12, D20-D23: antiparallel diode; D24-D27: diode; L1, L2: reactor; N1, N2: predetermined node (to which sub charging relays are connected); Q1-Q12, Q20-Q23: power semiconductor switching element; SCR1, SCR2: sub charging relay; SMR1, SMR2: system main relay; V1, V2, V3: voltage; Vmb: charging voltage (for main battery); Vsb: charging voltage (for auxiliary battery).

The invention claimed is:

1. A power supply apparatus for an electrically powered vehicle, comprising:
  a main power storage device;
  a sub power storage device outputting a voltage lower than that of said main power storage device;
  a charging device operative in external charging for performing first power conversion to receive power from an external power supply and convert the received power into power charged to said main power storage device; and
  a first switch connected between a predetermined node on an electric conduction path of said charging device in said first power conversion and said sub power storage device, and opened in said external charging,
  said charging device being configured such that when said external charging is not performed and said first switch is closed said charging device performs second power conversion to receive power from said main power storage device and convert the received power via at least a portion of said electric conduction path into power to be charged to said sub power storage device and said charging device outputs the converted power on said predetermined node.

2. The power supply apparatus for an electrically powered vehicle according to claim 1, wherein when said external charging is not performed, said first switch is closed and said charging device performs said second power conversion, depending on in what condition an auxiliary load operating on power received from said sub power storage device operates.

3. The power supply apparatus for an electrically powered vehicle according to claim 1, further comprising a power converter operative in said external charging for converting power on a path of said first power conversion into power charged to said sub power storage device, wherein the power provided via said power converter to be charged to said sub power storage device is smaller than that provided via said charging device through said second power conversion to be charged to said sub power storage device.

4. The power supply apparatus for an electrically powered vehicle according to claim 3, wherein said power converter is connected between a node electrically connected to said main power storage device and said sub power storage device.

5. The power supply apparatus for an electrically powered vehicle according to claim 3, wherein said power converter is connected between a node electrically connected to said external power supply and said sub power storage device.

6. The power supply apparatus for an electrically powered vehicle according to claim 3, wherein:
said charging device includes a DC/DC conversion unit configured with an isolation transformer included therein; and
said power converter is connected between a coil winding wound on a core of said isolation transformer and said sub power storage device.

7. The power supply apparatus for an electrically powered vehicle according to claim 1, wherein:
said charging device includes
a first power conversion unit for performing alternating current/direct current voltage conversion from a first power line connected to said external power supply toward a second power line, and
a second power conversion unit for performing bidirectional direct current/direct current voltage conversion between a third power line connected to said main power storage device and said second power line;
said predetermined node is provided on said second power line;
in said first power conversion, said first power conversion unit converts alternating current voltage on said first power line into direct current voltage and outputs the direct current voltage on said second power line and said second power conversion unit converts the direct current voltage on said second power line into voltage to be applied to charge said main power storage device and outputs the converted voltage on said third power line; and
in said second power conversion, said first power conversion unit is inactivated and said second power conversion unit receives voltage from said main power storage device on said third power line, buck-boosts the received voltage to voltage to be applied to charge said sub power storage device and outputs the buck-boosted voltage on said second power line.

8. The power supply apparatus for an electrically powered vehicle according to claim 1, wherein:
said charging device includes
a first power conversion unit operative in said first power conversion for performing alternating current/direct current voltage conversion from a first power line connected to said external power supply toward a second power line, and operative in said second power conversion for performing direct current/direct current voltage conversion from said second power line toward said first power line, and
a second power conversion unit for performing bidirectional direct current/direct current voltage conversion between a third power line connected to said main power storage device and said second power line;
in said first power conversion, said first power conversion unit converts alternating current voltage on said first power line into direct current voltage and outputs the direct current voltage on said second power line and said second power conversion unit converts the direct current voltage on said second power line into voltage to be applied to charge said main power storage device and outputs the converted voltage on said third power line;
in said second power conversion, said second power conversion unit receives voltage output from said main power storage device and transmitted on said third power line, buck-boosts the received voltage, and outputs the buck-boosted voltage on said second power line, and said first power conversion unit buck-boosts direct current voltage on said second power line to voltage applied to charge said sub power storage device; and
said predetermined node is provided on a power line receiving voltage output by said first power conversion unit to charge said sub power storage device.

9. The power supply apparatus for an electrically powered vehicle according to claim 1, wherein:
in said external charging when an auxiliary load operating on power received from said sub power storage device consumes power equal to or larger than a predetermined value said charging device operates to alternate a period of time of performing said first power conversion and a period of time of performing said second power conversion;
for said period of time for which said charging device performs said first power conversion, said first switch is opened, whereas a second switch connected between said external power supply and said charging device is closed; and
for said period of time for which said charging device performs said second power conversion, said first switch is closed, whereas said second switch is opened.

10. A method for controlling a power supply apparatus for an electrically powered vehicle including a main power storage device and a sub power storage device outputting a voltage lower than that of said main power storage device, the method comprising the steps of:
in external charging performed to charge said main power storage device by an external power supply, causing a charging device to perform first power conversion to receive power from said external power supply and convert the received power into power charged to said main power storage device;
in said external charging, opening a first switch switch connected between a predetermined node on an electric conduction path of said charging device in said first power conversion and said sub power storage device;

closing said first switch when said first power conversion is not performed; and when said first switch is closed, causing said charging device to perform second power conversion to receive power from said main power storage device, convert the received power via at least a portion of said electric conduction path into power to be charged to said sub power storage device, and output the converted power on said predetermined node.

11. The method for controlling a power supply apparatus for an electrically powered vehicle according to claim 10, further comprising the steps of:

when said external charging is not performed, determining whether it is necessary to charge said sub power storage device from in what condition an auxiliary load operating on power received from said sub power storage device operates; and inactivating said charging device when it is determined that it is unnecessary to charge said sub power storage device, wherein the step of closing closes said first switch when it is determined that it is necessary to charge said sub power storage device when said external charging is not performed.

12. The method for controlling a power supply apparatus for an electrically powered vehicle according to claim 10, further comprising the step of operating a power converter in said external charging for converting power on a path of said first power conversion into power charged to said sub power storage device, wherein the power provided via said power converter to be charged to said sub power storage device is smaller than that provided via said charging device through said second power conversion to be charged to said sub power storage device.

13. The method for controlling a power supply apparatus for an electrically powered vehicle according to claim 10, further comprising the steps of:

in said external charging, determining whether an auxiliary load operating on power received from said sub power storage device consumes power larger than a predetermined value; and when said auxiliary load consumes power larger than said predetermined value, controlling said charging device to alternate a period of time of performing said first power conversion and a period of time of performing said second power conversion, wherein:

for said period of time for which said charging device performs said first power conversion, said first switch is opened, whereas a second switch connected between said external power supply and said charging device is closed; and for said period of time for which said charging device performs said second power conversion, said first switch is closed, whereas said second switch is opened.

14. The method for controlling a power supply apparatus for an electrically powered vehicle according to claim 10, wherein:

said charging device includes a first power conversion unit for performing alternating current/direct current voltage conversion from a first power line connected to said external power supply toward a second power line, and a second power conversion unit for performing bidirectional direct current/direct current voltage conversion between a third power line connected to said main power storage device and said second power line;

said predetermined node is provided on said second power line;

the step of causing said charging device to perform said first power conversion includes the steps of controlling said first power conversion unit to convert alternating current voltage on said first power line into direct current voltage and output the direct current voltage on said second power line, and controlling said second power conversion unit to convert the direct current voltage on said second power line into voltage to be applied to charge said main power storage device, and output the converted voltage on said third power line; and the step of causing said charging device to perform said second power conversion includes the steps of controlling said second power conversion unit to receive voltage output from said main power storage device on said third power line, buck-boost the received voltage to voltage to be applied to charge said sub power storage device and output the buck-boosted voltage on said second power line, and inactivating said first conversion unit.

15. The method for controlling a power supply apparatus for an electrically powered vehicle according to claim 10, wherein:

said charging device includes a first power conversion unit operative in said first power conversion for performing alternating current/direct current voltage conversion from a first power line connected to said external power supply toward a second power line, and operative in said second power conversion for performing direct current/direct current voltage conversion from said second power line toward said first power line, and a second power conversion unit for performing bidirectional direct current/direct current voltage conversion between a third power line connected to said main power storage device and said second power line;

the step of causing said charging device to perform said first power conversion includes the steps of controlling said first power conversion unit to convert alternating current voltage on said first power line into direct current voltage and output the direct current voltage on said second power line, and controlling said second power conversion unit to convert the direct current voltage on said second power line into voltage to be applied to charge said main power storage device, and output the converted voltage on said third power line;

the step of causing said charging device to perform said second power conversion includes the steps of controlling said second power conversion unit to buck-boost voltage output from said main power storage device on said third power line and output the buck-boosted voltage on said second power line, and controlling said first power conversion unit to buck-boost direct current voltage on said second power line to voltage applied to charge said sub power storage device; and said predetermined node is provided on a power line line receiving voltage output by said first power conversion unit to charge said sub power storage device.

* * * * *